(12) United States Patent
Klassen et al.

(10) Patent No.: US 6,226,103 B1
(45) Date of Patent: May 1, 2001

(54) METHOD OF PRODUCING SPOT COLORS APPEARANCE WITH PROCESS COLOR PRINTING

(75) Inventors: R. Victor Klassen; Thomas M. Holladay, both of Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/146,225

(22) Filed: Sep. 2, 1998

(51) Int. Cl.$^7$ ....................................................... H04N 1/52
(52) U.S. Cl. ............................ 358/1.9; 358/534; 358/504
(58) Field of Search ............................ 358/1.9, 521, 518, 358/534, 536, 298, 504, 535, 457, 466, 456; 382/270

(56) References Cited

U.S. PATENT DOCUMENTS

| | | |
|---|---|---|
| 4,051,536 | 9/1977 | Roetling . |
| 4,149,194 | 4/1979 | Holladay . |
| 4,185,304 | 1/1980 | Holladay . |
| 4,245,258 | 1/1981 | Holladay . |
| 4,308,553 * | 12/1981 | Roetling ................................ 358/534 |
| 4,809,063 * | 2/1989 | Moriguchi et al. ................... 358/534 |
| 5,166,809 * | 11/1992 | Surbrook ............................... 358/456 |
| 5,175,804 | 12/1992 | Wittmann . |
| 5,198,910 | 3/1993 | Ng et al. . |
| 5,222,154 * | 6/1993 | Graham et al. ....................... 358/536 |
| 5,526,140 | 6/1996 | Rozzi . |
| 5,710,827 * | 1/1998 | Perumal, Jr. et al. ................. 358/1.9 |
| 5,822,451 * | 10/1998 | Spaulding et al. .................... 358/1.9 |

OTHER PUBLICATIONS

Article entitled: "Tone Reproduction and Screen Design for Pictorial Electrographic Printing," by Paul G. Roetling and Thomas M. Holladay; reprinted from *Journal of Applied Photographic Engineering*, vol. 5, No. 4, Fall 1979 (pp. 179–182).

"An Optimum Algorithm for Halftone Generation for Displays and Hard Copies," by Thomas M. Holladay; reprinted from *Proceedings of the SID*, vol. 21, No. 2, 1980 (pp. 185–192).

* cited by examiner

*Primary Examiner*—Scott Rogers
(74) *Attorney, Agent, or Firm*—Fay, Sharpe, Fagan, Minnich & McKee, LLP

(57) ABSTRACT

A system for producing a desired final halftone color. The system includes a plurality of halftone dot sets. Each dot set includes a plurality of halftone cells. Each halftone cell has a distinct number of sub-cells. Actual halftone levels of a plurality of component colors are produced by each halftone cell as a function of a number of the sub-cells within the halftone cell being selected. Combinations of the actual halftone levels of the respective component colors within each dot set producing respective actual final colors are associated with each of the dot sets. A database stores, for each dot set, the actual halftone levels for each component color produced by each halftone cell. A closest actual halftone color to the desired final halftone color is determined as a function of a combination of the actual halftone levels stored within the database for the respective component colors within one of the dot sets. The closest actual halftone color is produced using a color printer.

17 Claims, 8 Drawing Sheets

METHOD OF PRODUCING SPOT COLORS APPEARANCE WITH PROCESS COLOR PRINTING

BACKGROUND OF THE INVENTION

The present invention relates to producing spot colors using colors in the cyan, magenta, yellow, and black ("CMYK") color gamut. It finds particular application in conjunction with producing Pantone® colors using the CMYK colorant set and will be described with particular reference thereto. It will be appreciated, however, that the invention will also find application in producing other colors from other colorant sets, and the like. For example, the method could equally well be used to produce colors using a CMYKO (cyan, magenta, yellow, orange) colorant set.

Spot colors are solid regions of a color (e.g., a Pantone® color), which are normally formulated by mixing specific amounts of various inks. Conventionally, two (2) methods have been used to produce spot colors.

The first method produces a spot color without halftoning. Instead, a special housing is mounted inside a printer to provide one extra color ink for printing. Different color inks are pre-mixed in the housing to obtain the desired color. The resulting appearance is a smooth, solid color, regardless of where the color is located in the color gamut. This method has the obvious drawback of requiring an additional housing inside the printer. Furthermore, different color inks must be mixed in exact proportions to achieve the desired color before the additional housing is filled.

The second method, on the other hand, produces a spot color using halftoning. More specifically, varying amounts of the four colorants in the CMYK colorant set are used to produce numerous sub-spots which, when viewed from a distance, form the spot color. A halftone image is made up of a plurality of halftone dots, which, in turn, are made up of numerous colored pixels. If a spot color is created by printing $x_1$% of cyan, $x_2$% of magenta, $X_3$% of yellow, and $X_4$% of black, a respective percentage of the pixels within each dot are printed for each color. U.S. Pat. No. 4,149,194, which is incorporated herein by reference, describes the basic halftoning procedure.

A halftoned image is created by comparing each of the pixels of an original, continuous tone image with the value of a corresponding location in a halftone screen. FIG. 1 shows one possible halftone screen. The halftone screen consists of a set of thresholds 2, one corresponding to each location on the page. In typical use, a halftone screen is constructed by tiling a smaller array of thresholds, known as a halftone cell, throughout the page. If the value in the image is greater than that in the screen, a value for a respective colorant is set in the halftoned image, indicating the colorant is to be applied at that location. Otherwise a value is set to indicate that no colorant is to be applied at that location. This is done separately for each of the C, M, Y and K separations, which will typically use different screens.

In a clustered dot screen, the individual cells include one or more groups of adjacent pixels having relatively low thresholds. The center of any such cluster is a dot center, and corresponds to the center of a dark area in a corresponding final image.

FIG. 2 shows an image created using the halftone screen illustrated in FIG. 1 in which the levels of 68 through 74 are selected. Note that the dark pixels are grouped into clusters of pixels, which repeat periodically. Even if the lightness of the image is not constant, the centers of the clusters follow a consistent periodic pattern.

Each halftone cell is made up of a specified number of pixels, which are arranged into rows and columns. In the example of FIG. 1, one halftone cell contains eighteen (18) sub-cells which are organized into three (3) rows and six (6) columns. Such a configuration is referred to as a 3×6 halftone cell.

One characteristic of the halftone screen is frequency. The frequency of the halftone screen refers to the number of halftone dots per unit of length within the screen (e.g., dots per inch). In the screen of FIG. 1, the centers of the dots have threshold '3'. These are separated by approximately 4.24 pixels (the nearest '3' to any center is 3 pixels to the side and three pixels vertically). If this screen were used with, e.g. 600 pixel per inch printing, the screen frequency would be 600 pixels/inch * 1 spot/4.24 pixels=141 spots per inch.

In addition to a frequency, a screen has associated with it an angle. The angle of the cell depends on the amount the cell is shifted from one row of cells to the next, and on the collection of thresholds within the cell. The example of FIGS. 1 and 2 shows a 45 degree screen, so called because the dominant repeat pattern occurs at a 45 (and 135) degree angle with the horizontal.

An original continuous tone ("contone") image is halftoned by individually turning on or off the dots which make up corresponding cells within the halftone screen. More specifically, the original image is scanned four separate times (e.g., one time for each of the four colors in the CMYK color model). Each scan may begin, for example, in the top, left corner of the image. During the scan, each line of the original contone image is divided into segments such that each segment represents one sample area (also referred to as a pixel). Each sample area corresponds to one cell in the halftoned image.

Four separate screens are used, one for each separation. Screens are typically designed either by hand or with computer assistance. Because an arbitrary set of four screens will not generally produce a pleasing image, it is important that the four screens be designed as a set. This is especially the case for screens with small cells, such as in the example of FIGS. 1 and 2. A collection of screens, designed to be compatible, with one screen per separation, is called a "dot set".

Through the process described above, the original contone image becomes a binary image suitable for printing, displaying and/or viewing.

Because halftone screens having a higher frequency will, by definition, have more halftone cells within a defined area, those screens result in a halftoned image having a finer resolution. The finer resolution tends to produce a spot color having a smoother, more solid appearance. The human visual system cannot resolve spatial frequencies above about 60 cycles per degree (Wandell, Foundations of Vision, Sinauer Associates, 1995, inside front cover), under the best of conditions. Under normal viewing conditions, it can only resolve 20 cycles to 30 cycles per degree. At close inspection (e.g., 6 inches), a halftone screen having a screen frequency of 240 spots per inch has a repeat pattern of 24 cycles per degree, and under most conditions appears perfectly smooth. Screens having a lower frequency, on the other hand, appear more grainy causing the halftone screen to be visible within the halftoned image. Therefore, if a spot color is produced using halftoning, it would appear desirable to incorporate high frequency halftone screens into the image.

However, there is at least one drawback to creating spot colors using a high frequency halftone screen. Specifically, the halftone screen frequency is inversely related to the number of possible color levels which can be produced. Therefore, halftone cells incorporating a high frequency halftone screen are capable of producing fewer color levels. The increments between the shades of the color levels become visibly noticeable and are referred to as contouring, when a smooth gradient is printed using a halftone cell capable of producing too small a number of levels.

For spot color printing, contouring itself is not a problem, as gradient fills are not required. However, spot color printing is commonly used to produce specific colors, such as logo colors. Therefore, if only a small number of levels is available, the closest match may differ significantly from the desired color. Such a limitation is unacceptable in applications requiring nearly exact color matches.

The present invention provides a new and improved apparatus and method which overcomes the above-referenced problems and others.

SUMMARY OF THE INVENTION

A method of producing a single color halftone image includes selecting a dot set, based upon at least one criterion, from a plurality of dot sets. Each of the dot sets represents a collection of halftone screens. A halftoned image is then produced from the dot set.

In accordance with one aspect of the invention, the method also maps information, identifying respective features produced by the dot sets, to respective locations within a table. The information associated with the features is then retrieved from the table.

In accordance with a more limited aspect of the invention, the at least one criterion includes color levels. The step of mapping maps information identifying the color levels produced when various numbers of sub-cells within respective halftone screens are filled with respective colorants in a color space.

In accordance with another aspect of the invention, the mapping step maps each of the dot sets for a device dependent color space.

In accordance with a more limited aspect of the invention, the mapping step maps each of the dot sets for a color space including cyan, magenta, yellow, and black.

In accordance with another aspect of the invention, mapping step identifies at least one closest dot set satisfying the at least one criterion.

In accordance with a more limited aspect of the invention, the mapping step outputs a sample for each of the closest available dot sets, compares the samples to the at least one criterion, selects the closest available sample, and stores, in the table, information relating to the dot set producing the closest available sample.

In accordance with a more limited aspect of the invention, the identifying step identifies the dot set for creating the closest available sample.

One advantage of the present invention is that single color halftone images are produced without pre-mixing ink colors and adding an additional housing to a printer.

Another advantage of the present invention is that a large number of halftone colors are produced using high frequency halftone screens.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
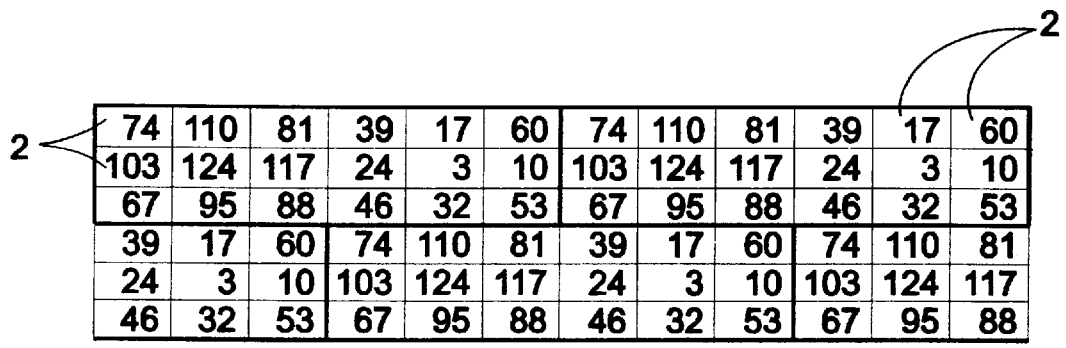
FIG. 1 illustrates a portion of a halftone screen made from a tiling of a 3×6 halftone cell.
Figure 2:
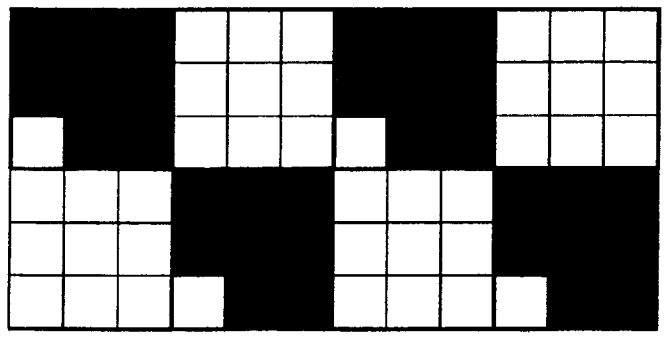
FIG. 2 illustrates a binary imaged formed using the screen of FIGURE A.
Figure 3:
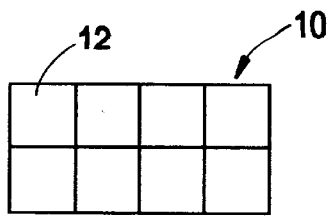
FIG. 3 illustrates a 2×4 halftone cell.

FIG. 3 illustrates a 2×4 halftone cell 10 used in a high frequency halftone screen. The 2×4 halftone cell 10 includes eight (8) dots 12 (i.e., sub cells) which can be individually "turned on" to create different levels of a color (e.g., cyan, magenta, yellow, and/or black). Because there are eight (8) sub cells 12, it is possible to create nine (9) different levels of the color (i.e., ranging from zero (0) sub cells turned on to all eight (8) sub cells turned on).

Figure 4:
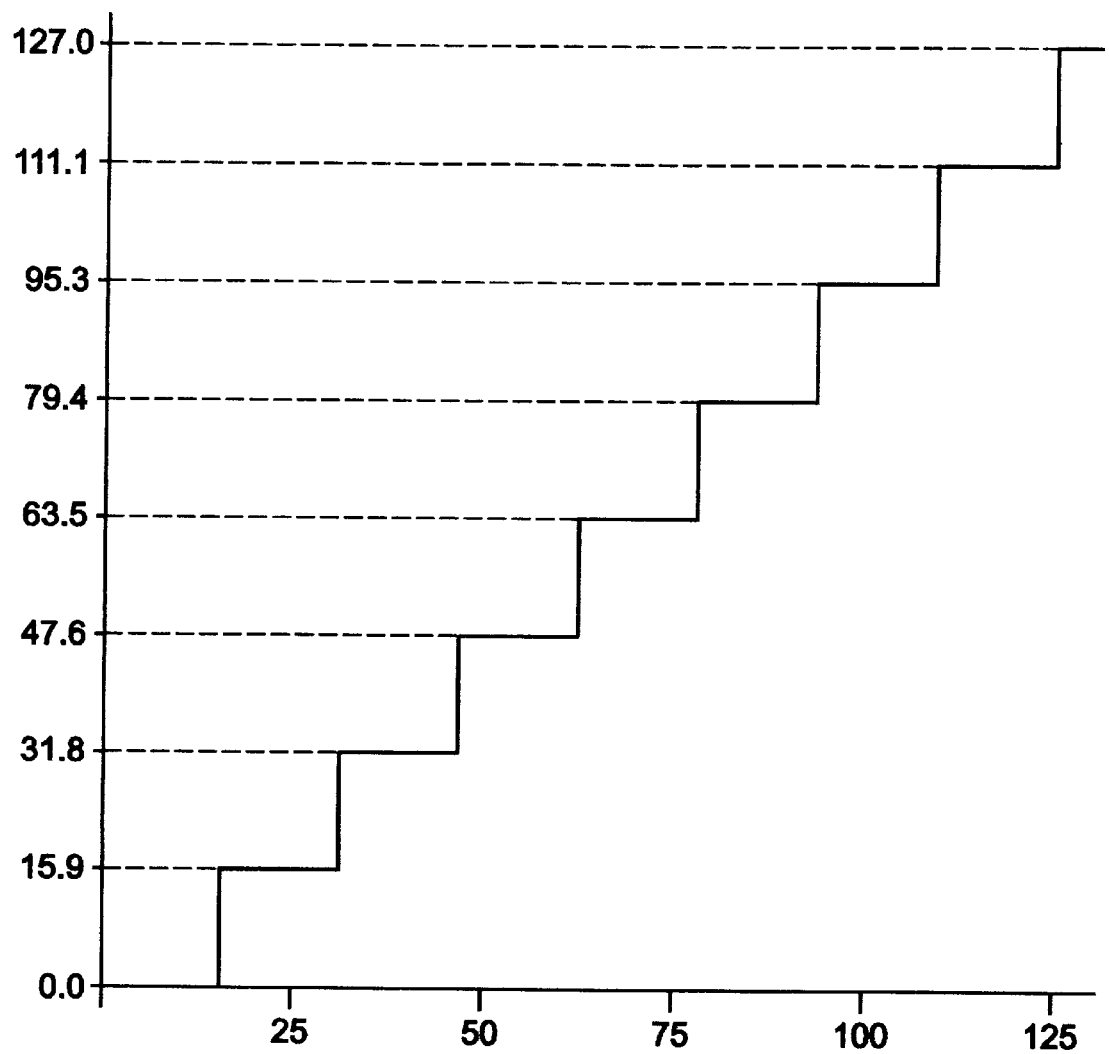
FIG. 4 illustrates a step function showing output color vs. input color for the halftone cell shown in FIG. 3.

FIG. 4 illustrates a step function showing output color vs. input color for the 2×4 halftone cell 10 shown in FIG. 3. For illustrative purposes the function mapping input to output color is treated as linear—that is, as each additional pixel is turned on, the same lightness change results. Assuming that there are 128 different possible color levels (ranging from 0 to 127), the nine output color levels obtainable from the 2×4 halftone cell 10 are 0.0, 15.9, 31.8, 47.6, 63.5, 79.4, 95.3, 111.1, and 127.0. Therefore, if a desired color (i.e., an input color) is, for example, 15.0, the output color level is 0.0. Similarly, if a desired color is 125, the output color level is 111.1. If a desired color happens to be very near to one of the output color levels obtainable, an accurate reproduction will be obtained, however, this is not the typical case.

Figure 5:
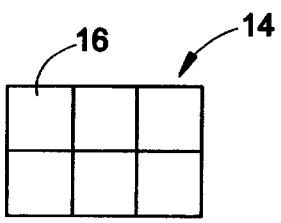
FIG. 5 illustrates a 2×3 halftone cell.

FIG. 5 illustrates a 2×3 halftone cell 14 used in a high frequency halftone screen. The 2×3 halftone cell 14 includes six (6) dots 16 (i.e., sub cells) which can be individually "turned on" to create different levels of a color. Because there are six (6) sub cells 16, seven (7) different levels of the color can be created.

Figure 6:
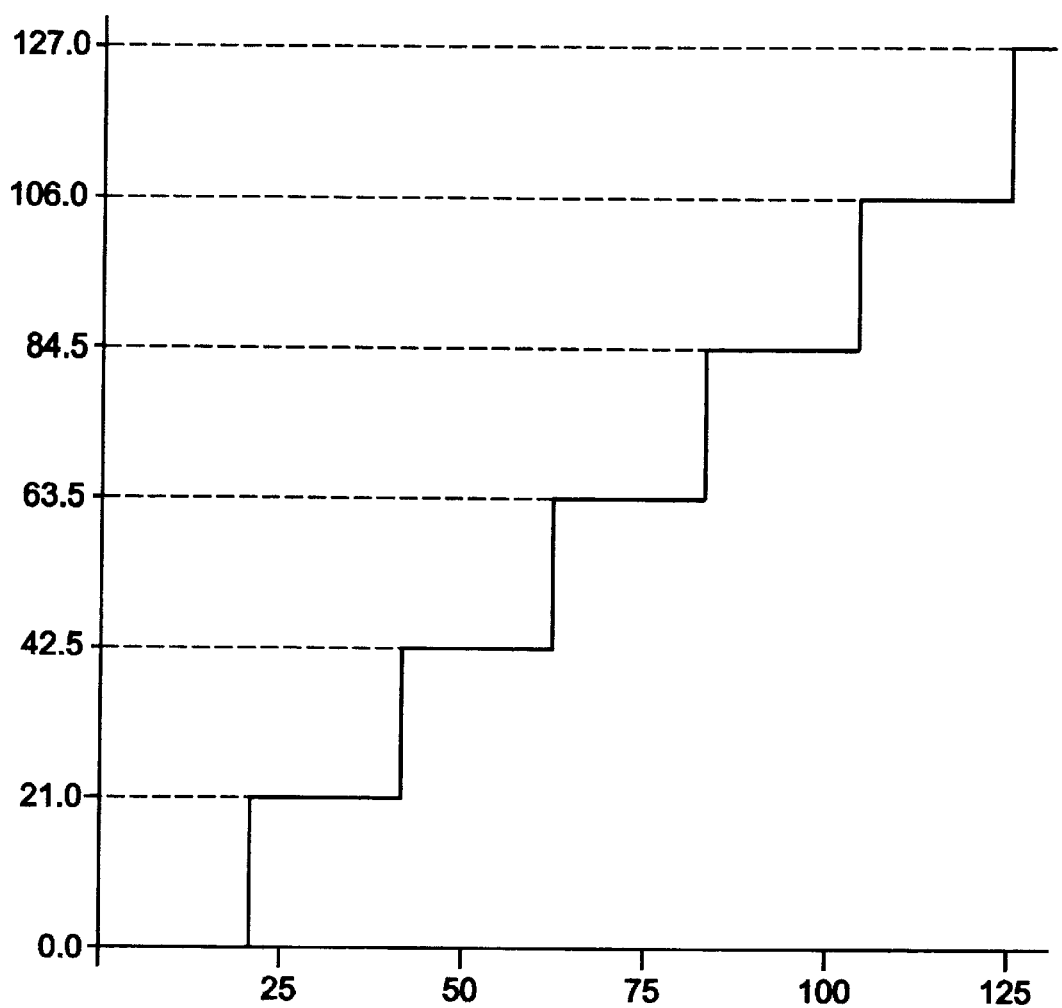
FIG. 6 illustrates a step function showing output color vs. input color for the halftone cell shown in FIG. 5.

FIG. 6 illustrates a step function showing output color vs. input color for the 2×3 halftone cell 14 shown in FIG. 3. Assuming that there are 128 different possible color levels (ranging from 0 to 127), the seven (7) output color levels obtainable from the 2×3 halftone cell are 0.0, 21.0, 42.5, 63.5, 84.5, 106.0, and 127.0. Notably, the combination of FIGS. 4 and 6 results in thirteen (13) possible output color levels (i.e., 0.0, 15.9, 21.0, 31.8, 42.5, 47.6, 63.5, 79.4, 84.5, 95.3, 106.0, 111.1, and 127.0). Therefore, using both a 2×4 halftone cell 10 and a 2×3 halftone cell 14, and selecting the one with the closer level to the desired level, results in four (4) more color levels produced than when the 2×4 halftone cell 10 is used alone and six (6) more color levels produced than when the 2×3 halftone cell 14 is used alone.

Figure 7:
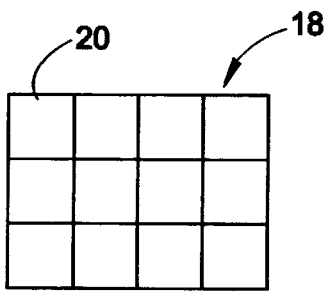
FIG. 7 illustrates a 3×4 halftone cell.

FIG. 7 illustrates a 3×4 halftone cell 18 used in a high frequency halftone screen. The 3×4 halftone cell 18 includes twelve (12) sub cells 20 which can be individually "turned on" to create the different color levels. Because there are twelve (12) sub cells 20, thirteen (13) different levels of the color can be created.

Figure 8:
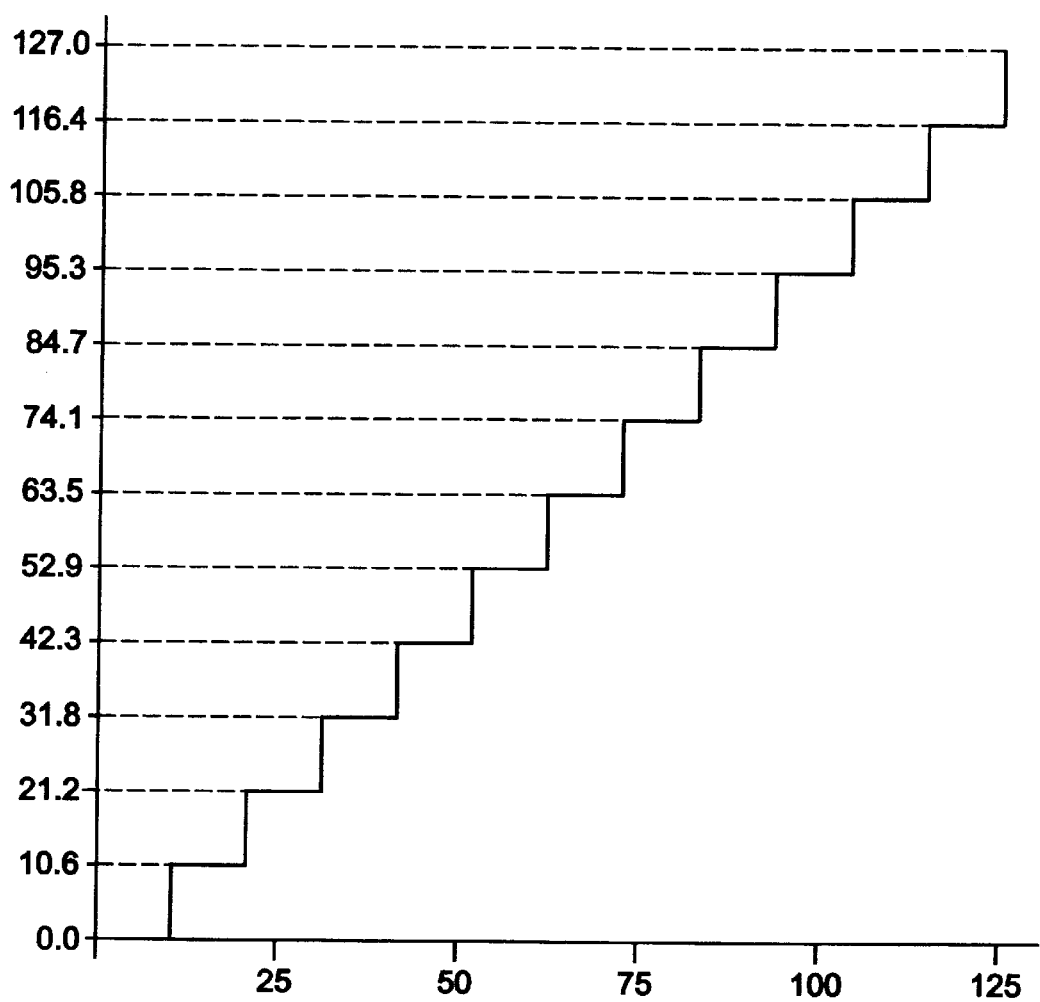
FIG. 8 illustrates a step function showing output color vs. input color for the halftone cell shown in FIG. 7.

FIG. 8 illustrates a step function showing output color vs. input color for the 3×4 halftone cell 18 shown in FIG. 5. Assuming that there are 128 different possible color levels, the thirteen (13) levels obtainable from the 3×4 halftone cell 18 are 0.0, 10.6, 21.2, 31.8, 42.3, 52.9, 63.5, 74.1, 84.7, 95.3, 105.8, 116.4, and 127.0. The combination of FIGS. 4, 6, and 8 results in twenty one (21) possible output color levels (i.e., 0.0, 10.6, 15.9, 21.0, 21.2, 31.8, 42.3, 42.5, 47.6, 52.9, 63.5, 74.1, 79.4, 84.5, 84.7, 95.3, 105.8, 106.0, 111.1, 116.4, and 127.0). Therefore, using a 2×4 halftone cell 10, a 2×3 halftone cell 14, and a 3×4 halftone cell 18 results in seven (7) additional color levels produced than when the 2×4 halftone cell 10 is used in combination with the 2×3 halftone cell 14 alone.

Figure 9:
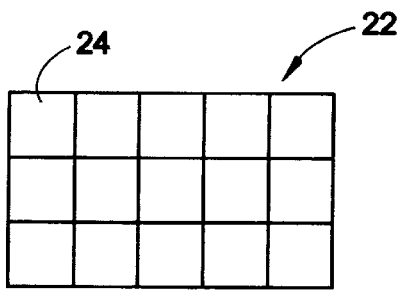
FIG. 9 illustrates a 3×5 halftone cell.

FIG. 9 illustrates a 3×5 halftone cell 22 used in a high frequency halftone screen. The 3×5 halftone cell 22 includes fifteen (15) sub cells 24 which can be individually "turned on" to create the different color levels. Because there are fifteen (15) sub cells 24, sixteen (16) different levels of the color can be created.

Figure 10:
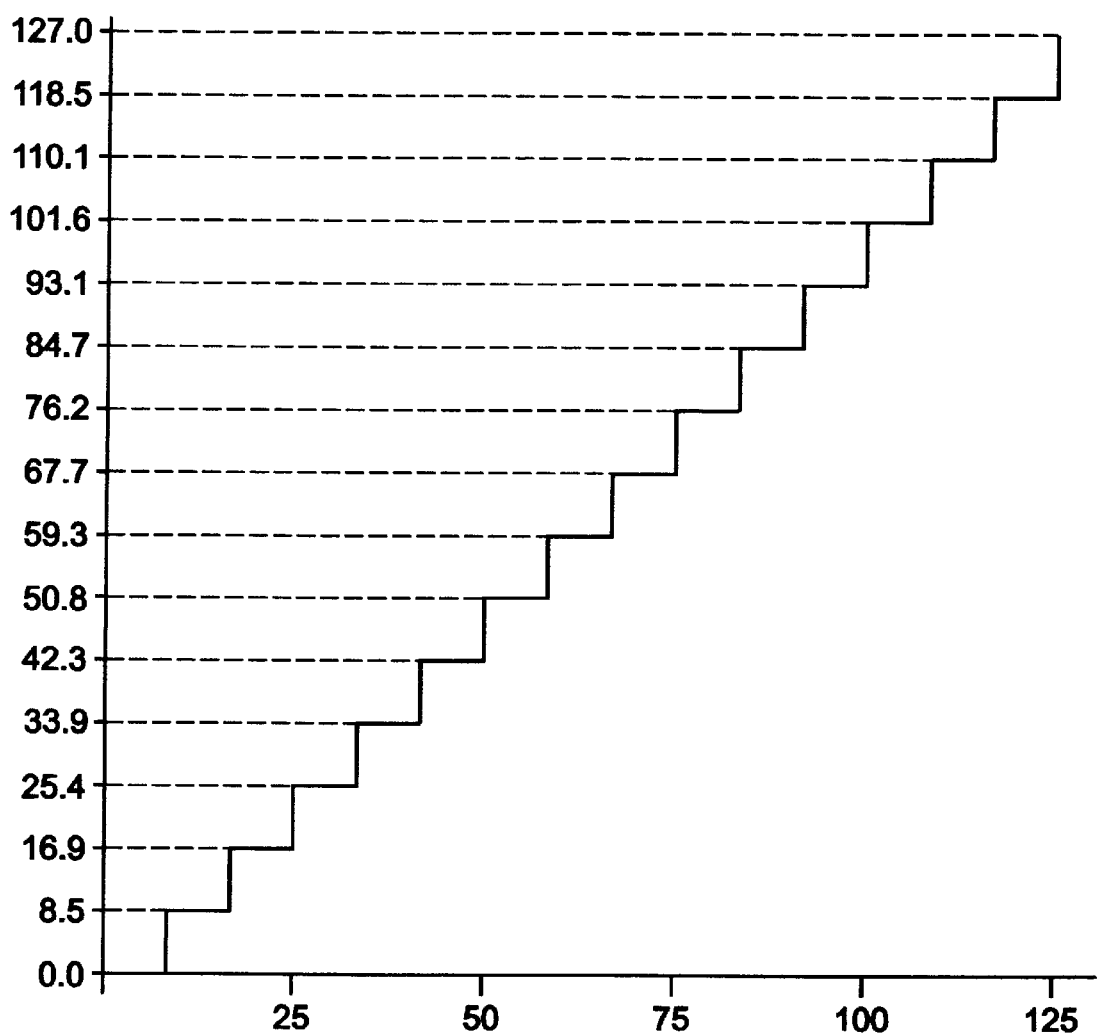
FIG. 10 illustrates a step function showing output color vs. input color for the halftone cell shown in FIG. 9.

FIG. 10 illustrates a step function showing output color level vs. input color level for the 3×5 halftone cell 22 shown in FIG. 7. Assuming that there are 128 different possible color levels, the sixteen (16) levels obtainable from the 3×5 halftone cell 22 are 0.0, 8.5, 16.9, 25.4, 33.9, 42.3, 50.8, 59.3, 67.7, 76.2, 84.7, 93.1, 101.6, 110.1, 118.5, and 127.0. The combination of FIGS. 4, 6, 8, and 10 results in thirty-three (33) possible output color levels (i.e., 0.0, 8.5, 10.6, 15.9, 16.9, 21.0, 21.2, 25.4, 31.8, 33.9, 42.3, 42.5, 47.6, 50.8, 52.9, 59.3, 63.5, 67.7, 74.1, 76.2, 79.4, 84.5, 84.7, 93.1, 95.3, 101.6, 105.8, 106.0, 110.1, 111.1, 116.4, 118.5, and 127.0). Therefore, using a 2×4 halftone cell 10, a 2×3 halftone cell 14, a 3×4 halftone cell 18, and a 3×5 halftone cell 22 results in twelve (12) additional color levels produced than when the 2×4 halftone cell 10 is merely used in combination with the 2×3 halftone cell 14 and the 3×4 halftone cell 18.

In practice, the levels are not evenly spaced as described, and they typically do not even follow the same curve. This means that using a single high frequency cell will result in some levels being even more distantly spaced than as shown, although when multiple cells are used, it is unlikely that levels other than 0 and 127.0 would coincide.

Figure 11:
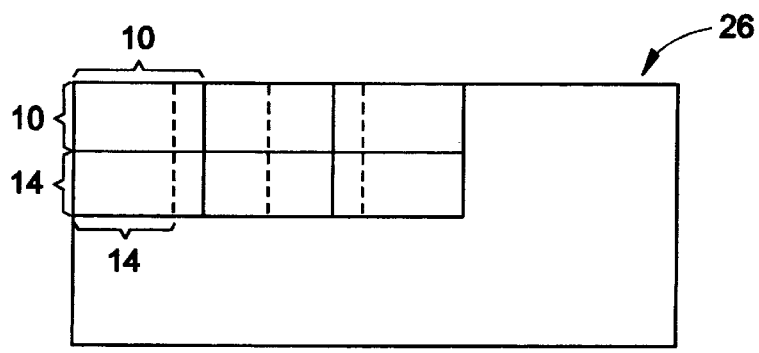
FIG. 11 illustrates a compound dot set.

The four (4) halftone cells illustrated in FIGS. 3, 5, 7, and 9 are combined with one another to create one separation of a compound dot set 26 (see FIG. 11). The cells shown are for one color separation only. A complete dot set includes cells (of likely different dimensions) for each of the other color separations. A compound dot set, as used in this invention, uses at least two complete dot sets for printing. For ease of illustration, only a partial compound dot set 26, including the 2×4 halftone cell 10 and the 2×3 halftone cell 14, are illustrated in FIG. 11. However, it is to be understood that a full compound dot set 26 includes a 2×4 halftone cell, a 2×3 halftone cell, a 3×4 halftone cell, and a 3×5 halftone cell, as well as corresponding cells for other separations.

As outlined above, the compound dot set 26 formed using a 2×4 halftone cell, a 2×3 halftone cell, a 3×4 halftone cell, and a 3×5 halftone cell is capable of producing thirty three (33) different output levels for the separation in which this set of cells is used, with similar numbers of output levels for the other separations in the CMYK color model. Consequently, the total number of different colors available from the roughly thirty three (33) different levels of the four separations in the CMYK color model is greatly increased. For example, the compound dot set illustrated in FIG. 11 may produce more than 1 million different colors. Multiple dot sets are created and used in conjunction with one another to increase the number of possible colors. It has been found that four (4) different dot sets, which include various numbers of halftone cells, is sufficient to produce the in-gamut colors of the less than 1,000 colors in the Pantonee color set with acceptable accuracy.

When producing a desired solid color halftone image using a compound dot set, desired color levels for each component color (e.g., cyan, magenta, yellow, and black), which define the color model (e.g., the CMYK color model), are identified in the desired final color (i.e., the color to be printed).

Then, it is determined which color levels are available from each of the halftone screens in each of the dot sets. For example, thirty-three (33) possible color levels are available, for each component color in the color model, from the dot set created from the halftone cells in FIGS. 3, 5, 7, and 9.

Next, for each dot set, the closest available color levels to each of the desired component color levels is identified. The closest available final colors are then determined by predicting which colors would result for each dot set if the closest available color levels within that dot set are combined. The dot set which produces the closest final color is then identified and used to produce the final single color halftone image. The final single color halftone image is typically produced using a color printing device 28 (e.g., a color printer or a color facsimile machine).

More specifically, the closest color for each dot set within the compound dot set is chosen, and then of those colors, the color difference between the printable color and the desired color is computed. The dot set with the least color difference is chosen and the color is printed using that dot set.

It is noted that different halftone cells within the dot set which is chosen to produce the final color theoretically may be used to produce each of the component colors in the final image. In practice, however, only two or three of the component colors are actually printed.

Figure 12:
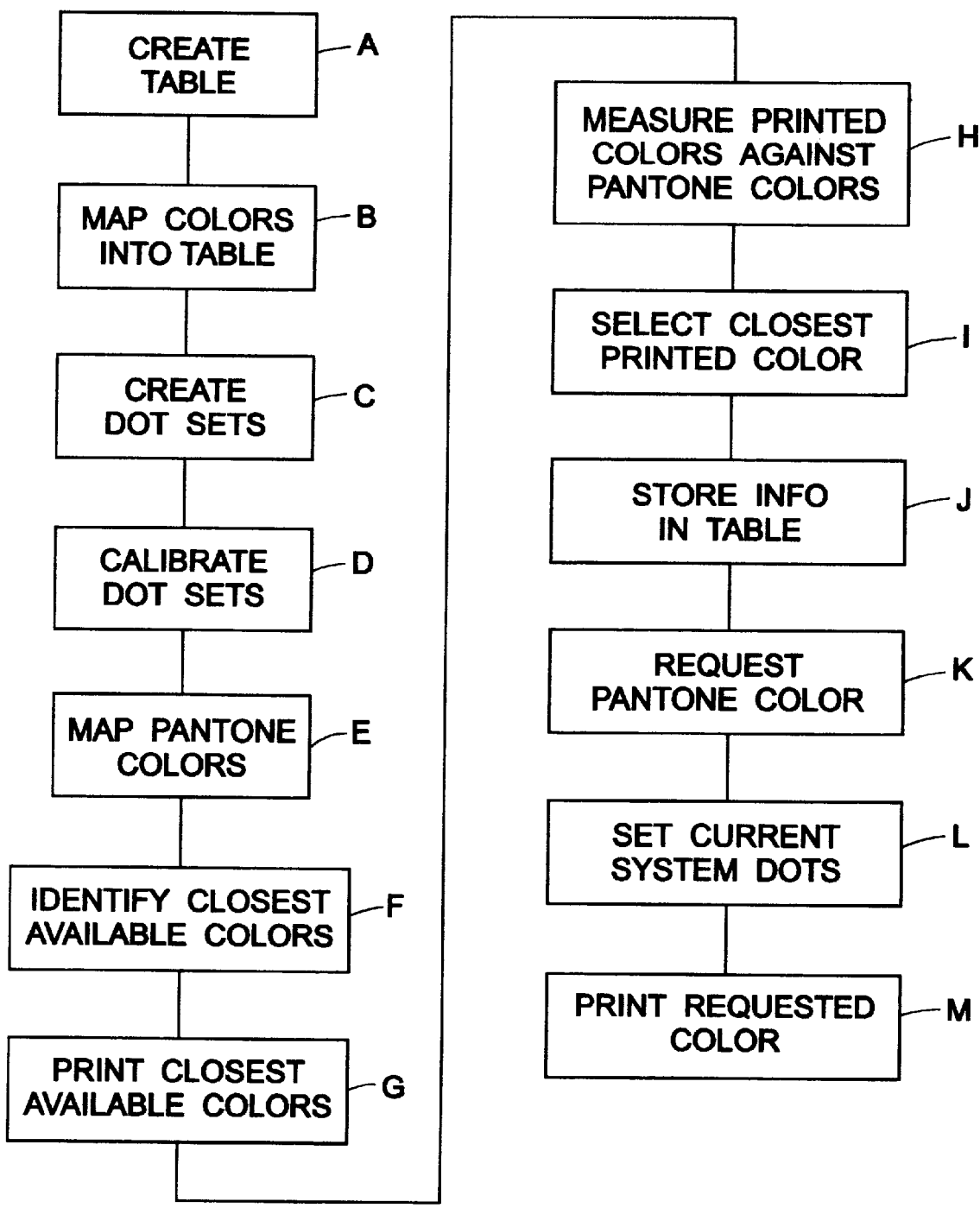
FIG. 12 illustrates the steps disclosed in the preferred embodiment of the present invention.

In the preferred embodiment, a table is created in a step A of FIG. 12. Each color in, for example, the Pantone® color set is mapped to a location in the table. Next, in a step B a percent of cells in a halftone screen, which are necessary to turn on for each color in a colorant set and, ultimately, in a dot set, is identified, for each Pantone® color. The percent of cells for each color in the colorant set is stored in the respective location of the table.

A plurality of dot sets are created in a step C. Each dot set is first calibrated using known techniques in a step D. Such a calibration maps the dot sets from a standard calibrated color space (e.g., L*a*b*) to a device dependent color space (e.g., CMYK). Then, in a step E each Pantone® color is mapped, for each dot set, from the L*a*b* color space to the CMYK color space using the mapping from the dot set calibrations. Therefore, if a compound dot set includes four (4) dot sets, each Pantone® color is mapped four (4) times.

The mapping typically yields amounts of required colorants which are not exactly achievable from the dot sets.

Therefore, the three closest available colors for each dot set are identified in a step F and printed in a step G. Since three (3) colors are printed for each of four (4) dot sets within a compound dot set, twelve (12) colors are printed to create each of the Pantone® colors. In this scenario, approximately one-half of the Pantone® colors are out of gamut for each of the dot sets. Nevertheless, roughly 6,000 printable colors are achievable (i.e., 500 colors in-gamut×12 approximations per color). In an alternate embodiment, only the closest color in each dot set is identified and printed.

Then, for at least one of the compound dot sets, all printed color approximations, or as many that are in-gamut, are measured against each of the Pantone® colors in a step H. For each Pantone® color, the closest printed color is selected in a step I. Indices representing the respective dot sets, along with coverage levels (i.e., the percentage of dots turned-on), for each of the separations, are stored into the table, in a step J, at a location corresponding to the Pantone® color.

When a specific Pantone® color is requested in a step K, the location within the table corresponding to that Pantone® color is accessed to identify the dot set and color levels corresponding to the requested color. The current system dots are then set in a step L to the corresponding dots in the identified dot set. In this manner, the requested Pantone® color is printed, in a step M, as if the user had requested the dot sets and dot percentages which create the Pantone® color instead of requesting the Pantone® color itself.

Figure 13:
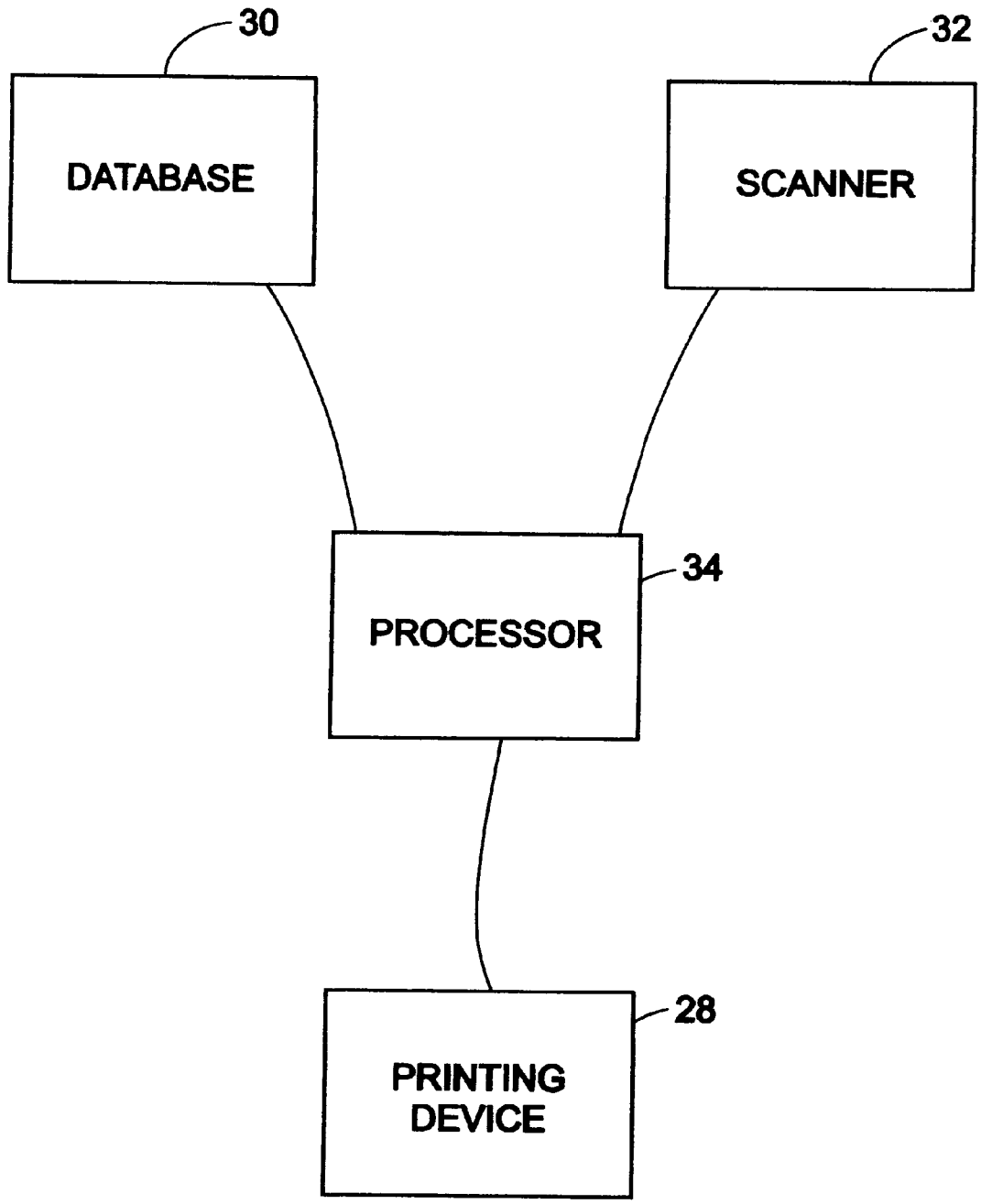
FIG. 13 illustrates a system for producing a halftone color image according to the present invention.

In an alternate embodiment, a database 30, which contains the output color levels for each of the halftone cells in each of the four (4) dot sets (e.g., dot set #1, dot set #2, dot set #3, dot set #4), is constructed. The database 30 is electrically connected to a scanner 32 via a processor 34 (see FIG. 13) which are used to scan an original image and determine the amount of component colors included in a desired final color. The color printer 28 is also connected to the processor 34.

The possible color levels for the halftone cells are retrieved from the database 30 to determine how accurately each dot set will produce each of the component colors required to produce a desired color in, for example, the Pantone® color set.

For example, if it becomes desirable to produce Pantone® color #74, one would first determine how much of each of the four (4) colors in the CMYK color model is required. More specifically, Pantone® color #74 includes $x_1\%$ of cyan, $x_2\%$ of magenta, $x_3\%$ of yellow and $x_4\%$ of black. The percent of each of the four color separations is then translated to desired color levels for each of the four (4) colors in the CMYK model. In other words, $x_1\%$ of cyan, $x_2\%$ of magenta, $x_3\%$ of yellow and $x_4\%$ of black may translate to cyan 45, magenta 120, yellow 67, and black 10.

Next, the database 30 is accessed to determine the closest color levels available from the halftone cells in each of the four dot sets. For example, if cyan 45 is required to produce the desired color, it will be determined by accessing the database that dot set #1 is capable of producing a color level of 47.6 from the first halftone cell, a color level of 42.5 from the second halftone cell, a color level of 42.3 from the third halftone cell, and a color level of 42.3 from the fourth halftone cell. Therefore, the closest cyan color level to cyan 45 which can be obtained from dot set #1 is cyan 42.5, which is produced using the second halftone cell in that dot set. Similar calculations are performed in each of the dot sets for each of the four colors in the CMYK color model. Consequently, sixteen (16) values, representing the four closest possible color output levels (i.e., one for each of the four (4) respective color separations) from each of the four (4) dot sets, are obtained.

The four (4) output colors from the four (4) respective dot sets are then combined to produce four (4) potential final output colors. More specifically, each of the four (4) potential final output colors is produced using one of the respective dot sets. The four (4) potential final output colors are then compared with the desired output color to determine which potential output color most closely matches the desired output color (i.e., which dot set produces the output color most closely matching the desired output color). Once this determination is made, the final color is printed on the color printing device 28 using the four (4) closest possible color output levels from one of the dot sets.

While the present invention has been described in terms of producing Pantone® colors using the CMYK color model, it is to be understood that producing other colors using other color models is also contemplated. Similarly, it is to be understood that producing spot colors using other criteria, such as frequency or manually selected weights, is also contemplated.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of producing a single color halftone image, including:
    selecting a dot set, based upon at least one criterion, from a plurality of dot sets, each of the dot sets representing a predetermined collection of halftone screens, each of the halftone screens in the respective dot sets being associated with one of a plurality of colors defining a color gamut;
    mapping information identifying respective features produced by the dot sets, to respective locations within a table;
    retrieving the information associated with the features from the table; and
    producing a halftoned image from the dot set.

2. The method of producing a single color halftone image according to claim 1, wherein the at least one criterion includes color levels, the mapping step including:
    mapping information identifying the color levels produced when various numbers of sub-cells within respective halftone screens are filled with respective colorants in a color space.

3. The method of producing a single color halftone image according to claim 1, wherein the mapping step includes:
    mapping each of the dot sets for a device dependent color space.

4. The method of producing a single color halftone image according to claim 3, wherein the mapping step includes:
    mapping each of the dot sets for a color space including cyan, magenta, yellow, and black.

5. The method of producing a single color halftone image according to claim 1, wherein the mapping step includes:
    identifying at least one closest dot set satisfying the at least one criterion.

6. The method of producing a single color halftone image according to claim 5, wherein the mapping step includes:
    outputting a sample for each of the closest available dot sets;

comparing the samples to the at least one criterion;

selecting the closest available sample; and storing, in the table, information relating to the dot set producing the closest available sample.

7. The method of producing a single color halftone image according to claim 6, wherein the identifying step includes:

identifying the dot set for creating the closest available sample.

8. A system for producing a single color halftone image, including:

means for selecting a dot set, based upon at least one criterion, from a plurality of dot sets, each of the dot sets representing a predetermined collection of halftone screens, each of the halftone screens in the respective dot sets being associated with one of a plurality of colors defining a color gamut;

means for mapping information identifying respective features produced by the dot sets, to respective locations within a table;

means for retrieving the information associated with the features from the table; and means for producing a halftoned image from the dot set.

9. The system for producing a single color halftone image according to claim 8, wherein:

the at least one criterion includes color levels; and the means for mapping information identifies the color levels produced when various numbers of sub-cells within respective halftone screens are filled with respective colorants in a color space.

10. The system for producing a single color halftone image according to claim 8, wherein the means for mapping maps each of the dot sets for a device dependent color space.

11. The system for producing a single color halftone image according to claim 10, wherein the means for mapping maps each of the dot sets for a color space including cyan, magenta, yellow, and black.

12. The system for producing a single color halftone image according to claim 8, wherein the means for mapping identifies at least one closest dot set satisfying the at least one criterion.

13. The system for producing a single color halftone image according to claim 12, wherein the means for mapping outputs a sample for each of the closest available dot sets, compares the samples to the at least one criterion, selects the closest available sample and stores, in the table, information relating to the dot set producing the closest available sample.

14. The system for producing a single color halftone image according to claim 13, wherein the means for mapping identifies the dot set for creating the closest available sample.

15. A method of producing a single color halftone image, including:

identifying the single color to be produced in the halftone image;

creating a plurality of dot sets, each dot set including a plurality of high frequency halftone cells, each halftone cell within a dot set having a distinct number of sub-cells and producing actual halftone levels of respective component colors when a characteristic number of sub-cells within the halftone cell is selected;

determining desired levels of a plurality of respective component colors included in a desired final color;

storing the desired levels in a database;

accessing the database and, for each dot set, choosing a closest actual color level to the desired level for each of the respective component colors;

estimating actual colors which would result from each dot set when the closest actual color levels for each component color within the respective dot set are combined;

selecting a closest actual halftone color produced by one of the dot sets, the closest actual halftone color most closely matching the desired final color; and producing the single color halftone image using the selected closest actual halftone color produced by the one dot set.

16. The method of producing a single color halftone image according to claim 15, wherein the choosing step includes:

choosing a smallest deviation between each actual color level and the desired level for the respective component color.

17. The method of producing a single color halftone image according to claim 15, wherein the producing step includes:

printing the desired final color on a color facsimile machine.

* * * * *